United States Patent Office 3,266,855
Patented August 16, 1966

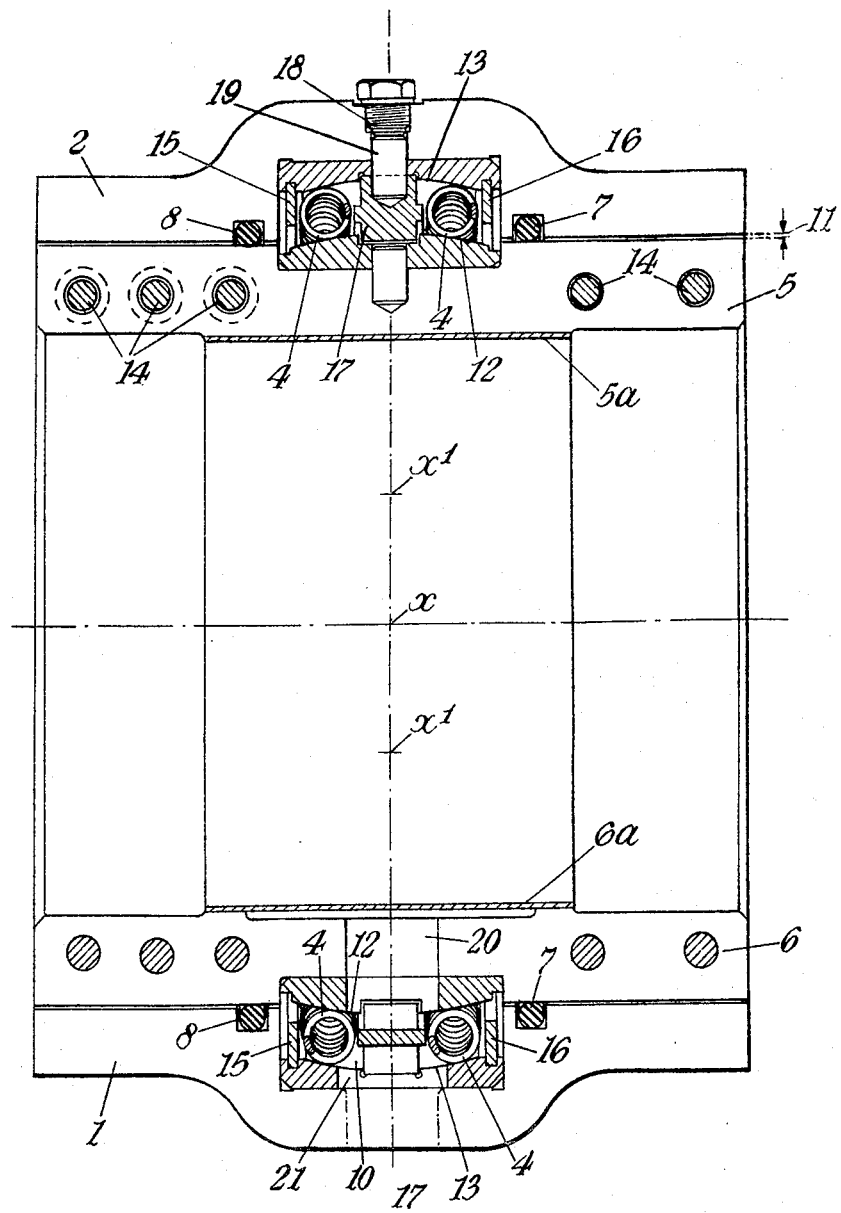

3,266,855
SELF-ALIGNING JOURNAL BEARINGS
Peter Herbert Cleff, Alnmouth, Northumberland, England, assignor to Pametrada, Wallsend, England, a corporation of Great Britain
Filed May 18, 1965, Ser. No. 456,769
Claims priority, application Great Britain, Nov. 1, 1960, 37,518/60
5 Claims. (Cl. 308—72)

This invention relates to self-aligning journal bearings where substantial angular misalignment between the rotating shaft and the bearing support structure exists or may occur, and safe and satisfactory operation of the bearing must be assured.

This application is a continuation-in-part of my copending application Serial No. 141,851, filed on September 29, 1961.

According to the invention, a journal bearing comprises a bearing member, an encircling supporting member for the bearing member, said bearing member having an external annular surface which is convex in axial cross section, said support member having an internal surface opposed to said external surface, spaced therefrom, and concave in axial cross section, and at least a pair of helical springs received in the space between the said two surfaces with their axes extending in a direction circumferential of the bearing member and in engagement with the said two surfaces to support the bearing member upon the support member, the said springs being flexible to distort by rolling about their axes upon the said surfaces during relative movement of the bearing member and the support member as the bearing member moves into and out of alignment with the support member, the said surfaces being nearly but not exactly parallel in axial cross-section, said surfaces being closer together at their axial end portions than in their centre portions to provide increasing restoring forces as the spring rolls about its axis.

In another aspect of the invention a journal bearing comprises a bearing member, an encircling supporting member for the bearing member, said bearing member having an external annular surface which is curved in axial cross section, said support member having an internal surface opposed to said external surface, spaced therefrom, and curved in axial cross section in the same sense as the said external surface, the centre of axial curvature in any axial section of the annular surface on the bearing member being further from the corresponding section of the annular surface on the supporting member than the centre of axial curvature on the said corresponding section, and at least two helical springs received in the space between the said two surfaces with their axes extending circumferentially of the bearing member and in engagement with the said two surfaces to support the bearing member upon the support member, the said springs being flexible to distort by rolling about their axes upon the said surfaces during relative movement of the bearing member and the support member as the bearing moves into and out of alignment with the support member.

The helical springs are provided so that the forces set up by misalignment of the shaft in relation to the bearing lead to an accommodating deflection of the bearing in the plane of misalignment, which is permitted by rolling of the spring on the tracks.

The supporting track profiles in an axial section are so shaped as to control the movement and deflection of the helical spring and by this means to achieve adequate accommodation of misalignment with a minimum of internal forces and to provide an increasing restraining force as the deflection increases.

The helical springs are of such form and size as adequately to support the journal load in addition to discharging the duties outlined above.

Since the assembly is concentric and symmetrical, misalignment in any plane may be accommodated.

The accompanying diagrammatic drawing illustrates by way of example, one mode of carrying the present invention into effect and a vertical section through a preferred form of bearing according to the invention.

Referring to the drawing, a bearing pedestal 1 is provided with a bearing cap 2 secured together in the usual manner by bolts (not shown).

Bearing half shells 5 and 6 are provided which are white-metalled at 5a and 6a respectively and are secured together by cap screws 14 so as to form one complete and self-contained bearing shell assembly. Inside the bearing assembly so formed runs a shaft which may be misaligned relatively to the stationary bearing pedestal.

Interposed between the pedestal and cap assembly 1, 2 and the complete bearing shell assembly 5, 6 a pair of endless flexible elements 4 are provided, each comprising a helical spring having its axis circumferential of the bearing.

Each helical spring which wrapped completely around the bearing shell assembly and has its two ends clipped together, if desired, for convenience in assembly.

Oil is supplied to the bearing in the conventional way, and the chamber 10 between the bearing shell assembly and the pedestal cap assembly is subjected to normal oil supply pressure.

Sealing rings 7 and 8 of resilient material are provided to prevent leakage of this supply oil whilst having sufficient flexibility to allow relative angular movement between the bearing shell assembly and pedestal cap assembly.

End plates 15, 16 formed in halves for assembly are provided whilst between the springs 4, is disposed a cage 17 to position the springs and, in conjunction with dowel 19 held in position by screw 18, to carry the journal load of the bearing in emergencies. Ports for oil inlet are provided in the inner and outer races such as at 20 and 21.

To allow this angular movement to take place, a predetermined radial clearance 11 is allowed between the bearing shell assembly and the pedestal cap assembly.

The spring element 4 initially rests on an annular track 12 external to the bearing shell assembly, the profile of this track in an axial plane being convex as shown.

On assembly of the complete bearing shell 5, 6 plus the spring element 4 in the pedestal 1 and bolting down of the cap 2 by means of screws 3 as shown in FIGURE 1, the spring element will now be seen to be also supported externally on an internal and concave track 13 machined into pedestal 1 and cap 2.

The centre of curvature $x$ of the track 12 in the axial plane is further away from the track 12 than the spacing between the outer track 13 and its centre of curvature $x'$.

As illustrated this track 12 is part spherical and is centred at the point $x$ on the axis of the bearing. The centre of axial curvature of the portion of the track 13 in the axial plane is at the point $x'$.

Owing to the difference between the diameters of the track 13 (measured at maximum) and the track 12 being made slightly less than twice the outside diameter of the spring elements 4 in an axial section of said element when free, tightening down of the cap 2 induces a radial compression in the spring element making it slightly elliptical in cross-section as shown exaggerated in the drawing.

The radial stiffness of the bearing shell assembly relatively to the pedestal is thus determined by the mean diameter of the helical springs forming the spring elements, the total number of turns, the wire diameter and the elastic properties of the material from which the wire is formed.

If angular misalignment now occurs between the shaft 9 and the pedestal cap assembly such misalignment will result in an angular movement of the bearing shell assembly relatively to the pedestal by virtue of the spring elements rolling about the helix axis, and in the direction of its toroidal axis relatively to and between the tracks 12 and 13.

Such rolling movement will not be uniform over the circumference of the springs 4, but will vary from substantially zero at parts on the axis of the misalignment to maxima in opposite direction at parts increasing between the parts of zero rolling. This differential motion gives a restraining force.

By suitable design of the axial profiles of the tracks 12 and 13 additional increases or decreases in radial compression can be induced in the spring element during the angular movement of the bearing shell assembly relatively to the pedestal and thus provide restoring forces which vary in a predetermined manner as the bearing shell assembly is moved from its zero misalignment to its maximum misalignment position.

As illustrated in the drawing however, the two tracks 12 and 13 converge slightly in axial direction away from the mid point so that such rolling of the spring elements 4 would cause a slight pinching action thereon to provide a restoring force dependent on the amount of misalignment of the shaft and bearing in relation to the pedestal.

The springs shown are of maximum coil diameter having regard to the angular space between opposed tracks. The stiffness i.e. load/deflection characteristics in both radial and angular directions are determined by the initial radial nip on the springs during assembly and by the diameter of the wire composing the springs; these are chosen to give the lowest angular stiffness consistent with adequate support for the radial journal load.

By a combination of initial radial deflection of the flexible element or elements and control through track shape of further deflection and movement, it is possible to absorb misalignment forces in springs which, although adequately stiff to support a substantial journal load, are sufficiently flexible not to store a large amount of internal energy when fully deflected within the permitted limits.

I claim:
1. A journal bearing comprising a bearing member, an encircling supporting member for the bearing member, said bearing member having an external annular surface which is convex in axial cross section, said support member having an internal surface opposed to said external surface, spaced therefrom, and concave in axial cross section, and at least a pair of helical springs received in the space between the said two surfaces with their axes extending in a direction circumferential of the bearing member and in engagement with the said two surfaces to support the bearing member upon the support member, the said springs being flexible to distort by rolling about their axes upon the said surfaces during relative movement of the bearing member and the support member as the bearing member moves into and out of alignment with the support member, the said surfaces being nearly but not exactly parallel in axial cross-section, said surfaces being closer together at their axial end portions than in their centre portions to provide increasing restoring forces as the spring rolls about its axis.

2. A journal bearing comprising a bearing member, an encircling supporting member for the bearing member, said bearing member having an external annular surface which is curved in axial cross section, said support member having an internal surface opposed to said external surface, spaced therefrom, and curved in axial cross section in the same sense as the said external surface, the centre of axial curvature in any axial section of the annular surface on the bearing member being further from the corresponding section of the annular surface on the supporting member than the centre of axial curvature of the said corresponding section, and at least two helical springs received in the space between the said two surfaces with their axes extending circumferentially of the bearing member and in engagement with the said two surfaces to support the bearing member upon the support member, the said springs being flexible to distort by rolling about their axes upon the said surfaces during relative movement of the bearing member and the support member as the bearing moves into and out of alignment with the support member.

3. A journal bearing as claimed in claim 1, wherein the said helical springs extend around the bearing member as continuous rings, each spring having its two ends joined together.

4. A journal bearing as claimed in claim 1, comprising a cage ring in the axial space between the springs to space them apart and to act as a support for the bearing member in case of failure of either of the helical springs.

5. A journal bearing as claimed in claim 1, including sealing rings of resilient material to prevent leakage of oil supplied to said annular space whilst having sufficient flexibility to allow relative angular movement between said bearing member and said supporting member.

References Cited by the Examiner

FOREIGN PATENTS

| | | |
|---|---|---|
| 575,839 | 5/1960 | France. |
| 965,096 | 5/1957 | Germany. |

DAVID J. WILLIAMOWSKY, *Primary Examiner.*

FRANK SUSKO, *Examiner.*